United States Patent [19]

Ito et al.

[11] Patent Number: 5,135,084
[45] Date of Patent: * Aug. 4, 1992

[54] CLUTCH

[75] Inventors: Kenichiro Ito, Shizuoka; Hiromi Nojiri; Kenro Adachi, both of Iwata, all of Japan

[73] Assignee: NTN Corporation, Osaka, Japan

[*] Notice: The portion of the term of this patent subsequent to Feb. 20, 2007 has been disclaimed.

[21] Appl. No.: 666,762

[22] Filed: Mar. 8, 1991

Related U.S. Application Data

[62] Division of Ser. No. 359,260, May 31, 1989, Pat. No. 5,016,740.

[30] Foreign Application Priority Data

Jul. 14, 1988 [JP] Japan .................. 63-93300
Sep. 20, 1988 [JP] Japan .................. 63-235731

[51] Int. Cl.$^5$ ........................ F16D 15/00; F16D 43/20
[52] U.S. Cl. ........................ 192/38; 192/41 A; 192/45.1; 192/54
[58] Field of Search .............. 192/37, 38, 41 A, 45.1, 192/44, 43, 43.1, 54; 74/388 PS; 180/79.1; 188/134

[56] References Cited

U.S. PATENT DOCUMENTS

Re. 25,594  6/1964  Lund ................................ 188/134
4,901,831  2/1990  Ito et al. ............................ 192/38

Primary Examiner—Rodney H. Bonck
Attorney, Agent, or Firm—Armstrong & Kubovcik

[57] ABSTRACT

A clutch having an outer ring, an inner shaft mounted in the outer member, a cage interposed between the outer ring and the inner shaft and cam members movably mounted in pockets formed in the cage. A torque-setting elastic member is provided between the cage and one of the outer ring and the inner shaft so that while the torque on the elastic member is smaller than a preset value, they will rotate in unison with some clearance left therebetween in the direction of rotation. When the torque on the elastic member gets larger than the preset value, the elastic member deforms to allow the cage to turn relative to the member engaged therewith. Now, the cam elements are pushed by the cage into engagement with both cam surfaces formed on the inner periphery of the outer member and the other periphery of the inner member, thus bringing the two members into engagement. This input shaft is rotatably mounted in the outer ring by means of two bearings so as to extend through the outer ring.

3 Claims, 8 Drawing Sheets

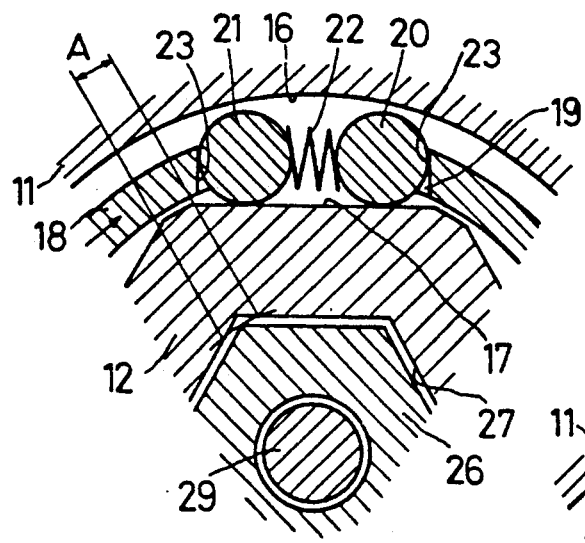
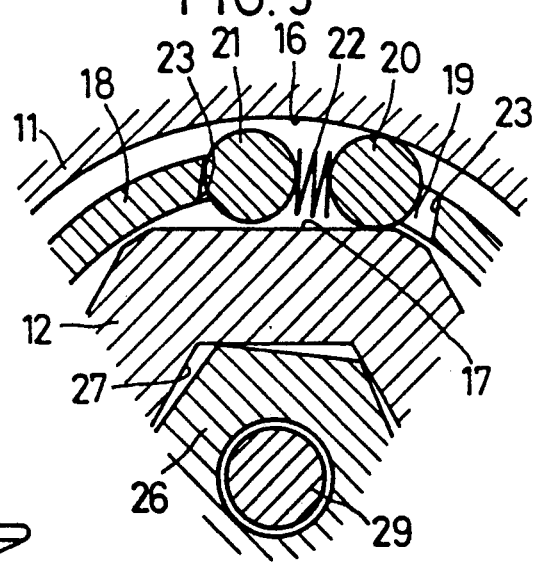
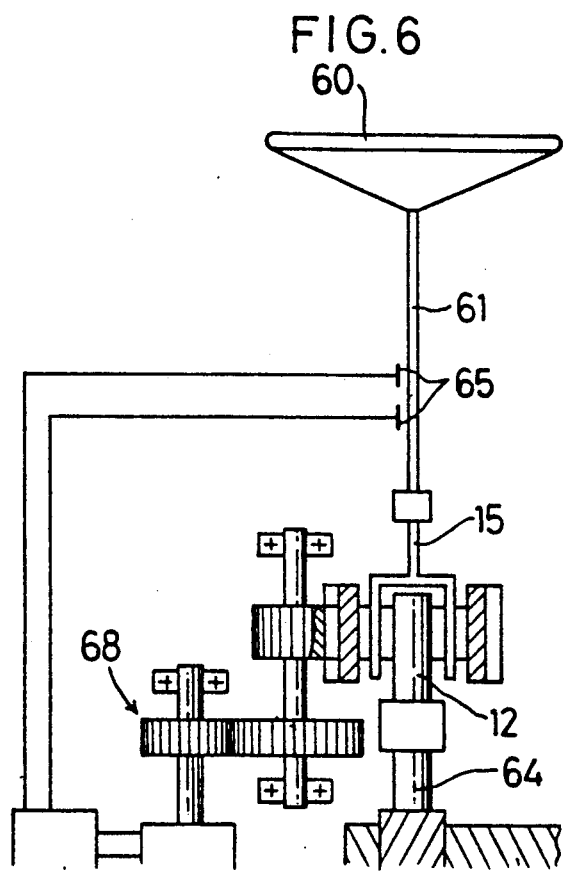

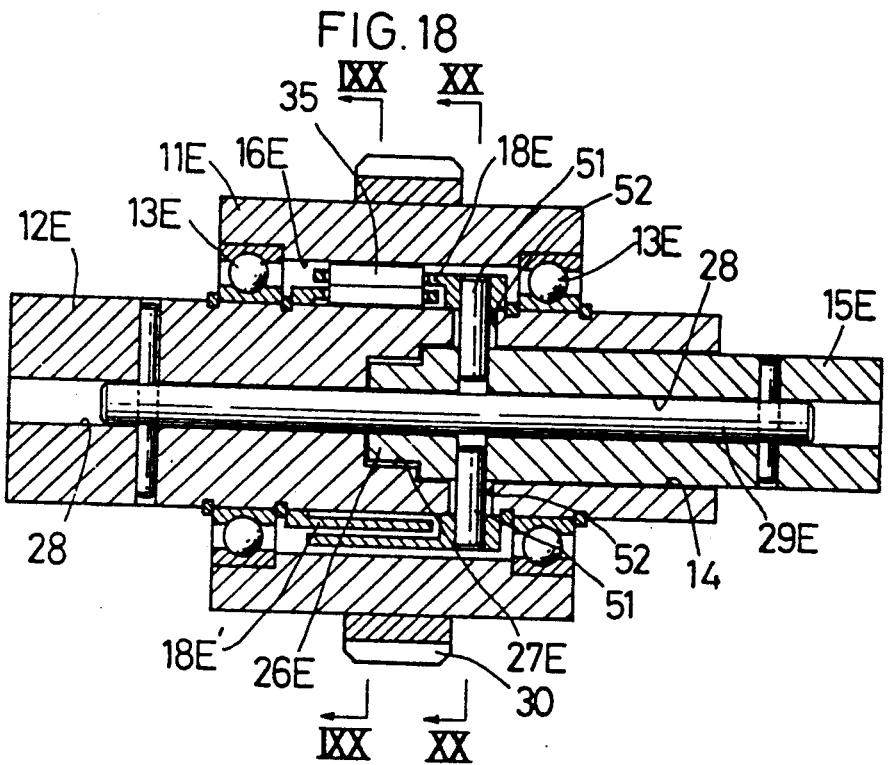
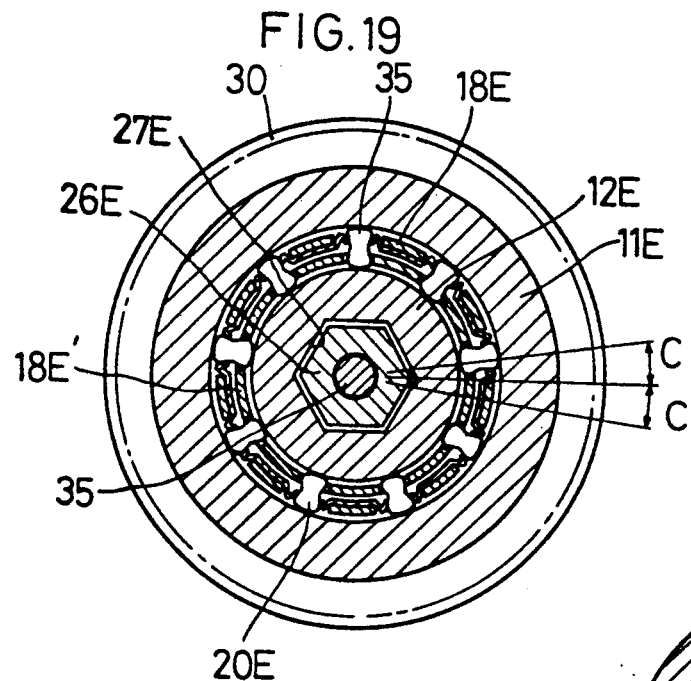
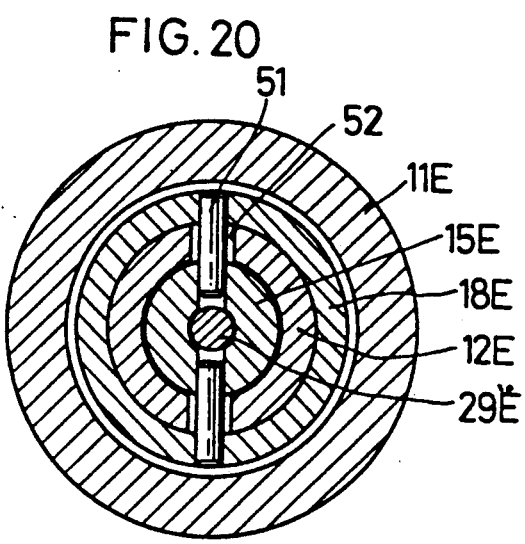

CLUTCH

This is a division of application Ser. No. 359,260 filed May 31, 1989 and now U.S. Pat. No. 5,016,740.

The present invention relates to a clutch suitable for use with e.g. an electric power steering assembly.

A typical prior art electric power steering assembly is shown in FIG. 21. With this type of assembly, a torque sensor 4 is provided which serves to actuate a motor 6 through a control unit 5 upon detection of a torque to a steering shaft generated owing to the resistance of vehicle wheels 2 when a steering wheel 1 is turned in one direction. The motor 6 has its drive shaft coupled to a pinion 8 of the steering shaft 3 through a reduction unit 7. The pinion 8 meshes with a rack 9 connected to the vehicle wheels 2. With this arrangement, since the driving power of the motor 6 is transmitted to the wheels, they can be controlled with a very small manual steering force.

But, this type of electric power steering assembly has one drawback that if the driving system including the control unit 5, the motor 6 and the reduction unit 7 should get out of order, the force required to turn the steering wheel 1 will become too large to steer the vehicle wheels 2. This is because the reduction unit 7 and the motor 6 are still coupled to the steering shaft 3.

As one solution to this problem, it is known to provide a clutch 10 between the reduction unit 7 and the pinion 8. But if an electromagnetic clutch is used, it is necessary to use a rather large-sized one to obtain a required torque. If a claw clutch is used, a rather large force is required to set the clutch in an engaging position and to disengage it under loaded conditions.

An object of the present invention is to provide a clutch which obviates the abovesaid shortcomings.

In accordance with the present invention, there is provided a clutch comprising: an outer ring formed on its inner periphery with a first cam surface; an output shaft rotatably supported in the outer ring and formed on its outer periphery with a second cam surface; an input shaft rotatably mounted in the outer ring and coupled with the output shaft; a pair of bearings, one of which is for supporting the output shaft and the other is for supporting either the output shaft or the input shaft; a cage interposed between the outer ring and the output shaft and formed with a plurality of pockets; a plurality of cam members disposed between the bearings and mounted in the respective pockets and adapted to come into engagement with the first and second cam surfaces when the outer ring is turned with respect to the output shaft; elastic means mounted in the pockets for biasing the cam members into engagement with the cam surfaces; engaging means for bringing the input shaft into engagement with one of the outer ring and the output shaft with a clearance left therebetween in the direction of rotation; and a torque-setting elastic member mounted between the input shaft and one of the outer ring and the output shaft to hold the cam members in a neutral position with the clearance left therebetween so as to be deformed until the clearance disappears when it is subjected to a larger torque than a predetermined torque; the cam members being not in engagement with either of the first or second cam surface in the neutral position.

Other features and objects of the present invention will become apparent from the following description taken with reference to the accompanying drawings, in which:

FIG. 4 is an enlarged sectional view of a portion of the same;

FIG. 5 is a similar view of the same showing a different state;

FIG. 6 is a schematic view of a power steering assembly equipped with the clutch according to the present invention;

FIG. 18 is a vertical sectional front view of the fifth embodiment;

FIG. 19 is a sectional view of the same taken along line 19—19 of FIG. 18;

FIG. 20 is a sectional view of the same taken along line 20—20 of FIG. 18; and

FIRST EMBODIMENT

Figure 1:
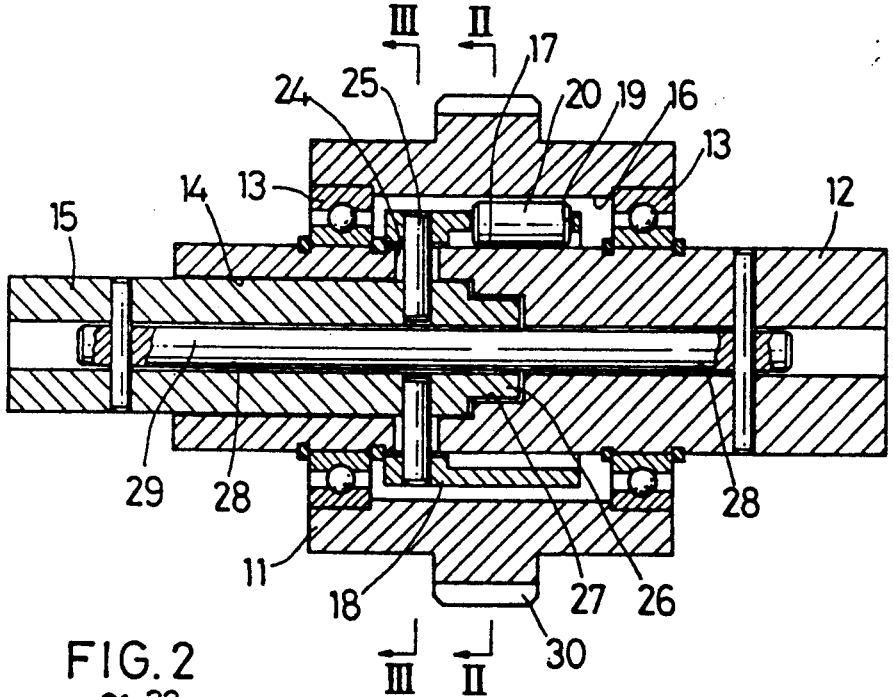
FIG. 1 is a vertical sectional view of the first embodiment of the present invention.

FIGS. 1 to 5 show the first embodiment which has a cylindrical outer ring 11 and an output shaft 12 mounted in the outer ring and rotatably supported by two bearings 13 (FIG. 1) so as to extend through the outer ring 11.

The output shaft 12 is formed in its one end face with an axial bore 14 to receive an input shaft 15.

Figure 2:
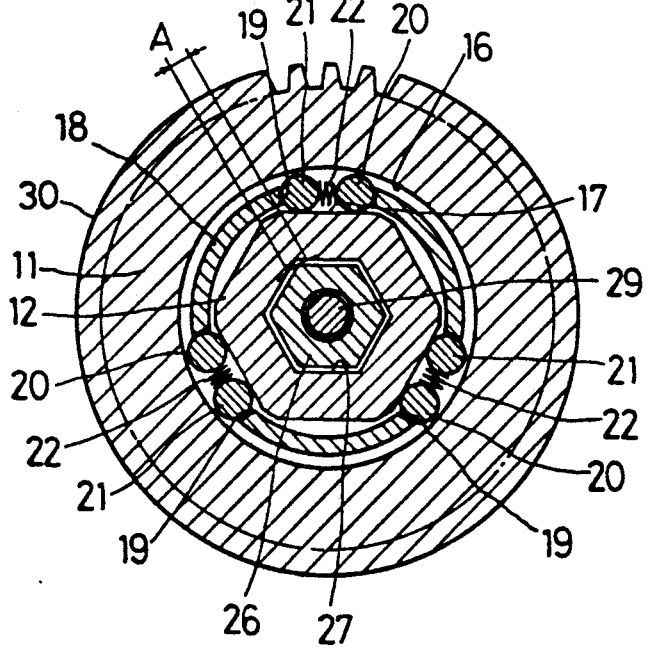
FIG. 2 is a sectional view of the same taken along line 2—2 of FIG. 1.

The outer ring 11 has a cylindrical inner surface 16 serving as a cam surface, and the output shaft 12 has an outer polygonal surfaces 17, each of which serves as a cam surface (FIG. 2).

A cylindrical cage 18 is mounted between the outer ring 11 and the output shaft 12. The cage 18 is formed with pockets 19 so as to oppose to some of the flat faces of the polygonal surface 17. In each pocket 19, a cam member 20 for forward rotation and a cam member 21 for reverse rotation are mounted. Between the pair of cam members 20 and 21, a spring 22 is interposed to bias them away from each other and against opposed wall surfaces 23 of each pocket 19 (FIG. 4).

Figure 3:
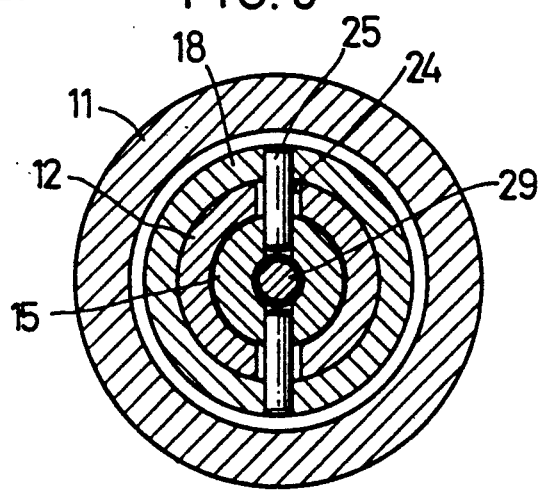
FIG. 3 is a sectional view of the same taken along line 3—3 of FIG. 1.

As shown in FIGS. 1 and 3, the output shaft 12 is formed with radial holes 24 in which pins 25 are loosely inserted. The input shaft 15 and the cage 18 are coupled together by the pins 25 so as to be rotatable in unison with each other.

As shown in FIGS. 1 and 2, the input shaft 15 has an end portion 26 which is received in a polygonal hole 27 formed in the extremity of the bore 14 with a play or clearance A in the direction of rotation. (FIG. 4)

Axial center bores 28 are formed to extend through the input shaft 15 and the output shaft 12. (FIG. 1) A torque-setting elastic member 29 in the form of a torsion bar is mounted in the bores 28 and has both ends thereof fixed to the input shaft 15 and the output shaft 12, respectively. (FIG. 1)

The bias of the torque-setting member 29 is predetermined so that if the input shaft 15 is subjected to a turning torque larger than a predetermined value, the member 29 will be distorted until the clearance A disappears, thus bringing the input shaft 15 into engagement with the output shaft 12.

A shown in FIG. 6, when applying the clutch of the first embodiment to an electric power steering assembly, the input shaft 15 is coupled to a steering shaft 61 provided with a steering wheel 60, and the output shaft 12 is coupled to a shaft 64 for a pinion 63 in meshing engagement with a rack 62.

The steering shaft 61 is provided with a torque detecting sensor 65 adapted to actuate a motor 67 through a control unit 66. The driving force of the motor 67 is transmitted to the outer ring 11 through a torque transmission mechanism 68. For this purpose, a gear 30 is formed on the outer periphery of the outer ring 11 (FIG. 1).

When the steering wheel 60 is turned in such a direction as to rotate the cage 18 to the righthand side or in the direction shown by arrow of FIG. 4, if the steering force is smaller than the preset torque determined by the bias of the torque-setting elastic member 29, the cage 18 will hardly be rotated with respect to the output shaft 12. Thus, the cam members 20 and 21 for forward and reverse rotation are both kept out of engagement with the inner and outer cam surfaces 16 and 17, so that the clutch will be kept inoperative.

Thus, while the steering force is small, no power transmission from the outer ring 11 to the output shaft 12 will take place. This means that that vehicle is steered only with the manual steering force.

If the manual steering force exceeds the present torque determined by the bias of the torque-setting elastic member 29, it will be distorted, thus turning the cage 18 to the right with respect to the output shaft 12. The cage 18 will push the cam members 20 for forward rotation, one of which is shown in FIG. 4 at the righthand side, through the springs 22 until they get locked between the inner cylindrical cam surface 16 on the outer ring 11 and the outer polygonal cam surface 17 on the output shaft 12 as shown in FIG. 5. The clutch will operate.

The vehicle wheels will offer resistance in response to the steering force, thus producing a turning torque on the steering shaft 61. The torque sensor 65 will pick up the torque to the steering shaft 61 and start the motor 67 through the control unit 66. The driving power of the motor 67 will be transmitted to the outer ring 11, then to the output shaft 12, which is now in engagement with the outer ring 11 through the cam members 20, and to the vehicle wheels through the pinion shaft 64, pinion 63 and rack 62.

As described above, the power steering mode will start when the manual steering force exceeds the preset torque, thus making it possible to control the vehicle wheels with a minimum steering force.

If the driving system including the control unit 66 and the motor 67 should get locked for some reason, the input shaft 15 and the cage 18 integral with the input shaft can still be turned e.g. to the righthand side with respect to the output shaft 12 by turning the steering wheel 60. This causes the cam members 20 for forward rotation to move to the right and get locked between the inner and outer cam surfaces 16 and 17 as shown in FIG. 5. But only the torque of the cage 18 is not enough to bring the outer ring 11 and the output shaft 12 into engagement with each other. The manual steering force is now transmitted to the output shaft 12 by the engagement between the polygonal portion 26 of the input shaft 15 and the polygonal hole 27 of the output shaft and thus to the vehicle wheels. Since the steering wheel is disconnected to the driving system, a manual steering force necessary to control the vehicle wheels cannot become excessive.

Next, it will be described how the clutch will operate when the steering wheel is receiving a counterforce from the vehicle wheels with the driving system malfunctioning. When the vehicle is getting clear of a curve on the road, a force which counteracts the steering force is conveyed from the vehicle wheels to the steering wheel through the rack 62, pinion 63, pinion shaft 64 and output shaft 12. To let the steering wheel slowly turn back to its original position with such a counterforce from the vehicle wheels, the driver slackens the steering force until it gets smaller than the preset torque for the torque-setting elastic member 29. In this state, since the input shaft 15 can scarcely turn with respect to the output shaft 12, the cam members 20 and 21 for forward and reverse rotations are kept out of engagement with the cam surfaces 16 and 17. Thus the outer ring 11 is kept out of engagement with the output shaft 12. Thus, when the vehicle is clearing a curve, the cage 18, the input shaft 15 and thus the steering wheel 60 will turn smoothly back into their original position without giving the driver any bad steering feeling.

SECOND EMBODIMENT

Figure 7:
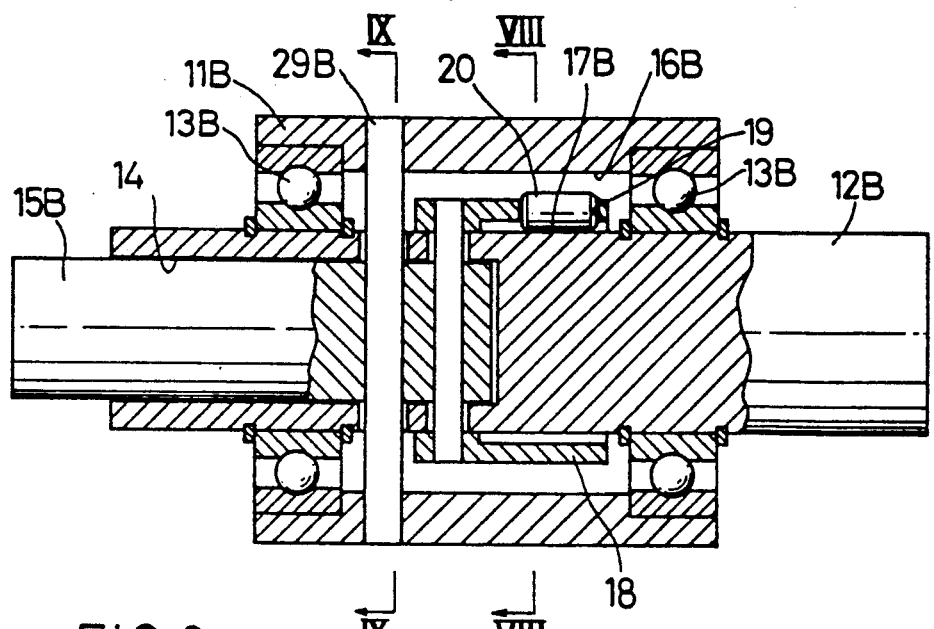
FIG. 7 is a vertical sectional front view of the second embodiment.
Figure 8:
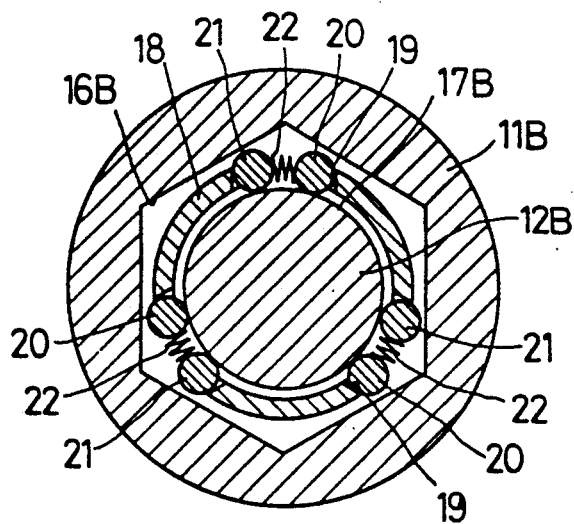
FIG. 8 is a sectional view of the same taken along line 8—8 of FIG. 7.
Figure 9:
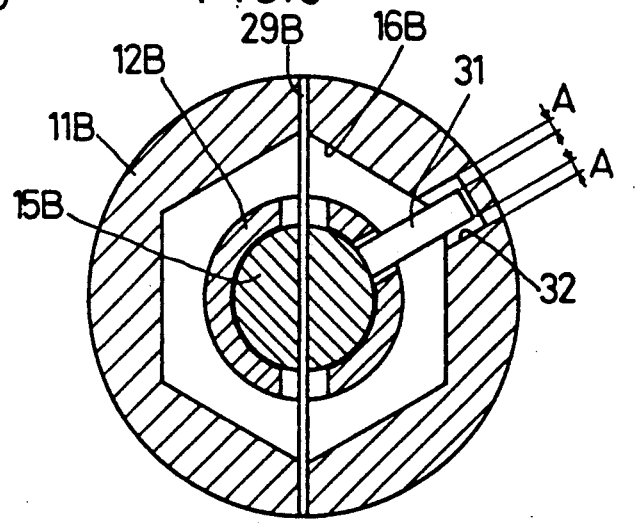
FIG. 9 is a sectional view of the same taken along line 9—9 of FIG. 7.

FIGS. 7 to 9 show the second embodiment in which an outer ring 11B is formed on its inner periphery with a polygonal cam surface 16B, whereas a clutch shaft 12B has a cylindrical outer cam surface 17B. In other words, the polygonal surface and the cylindrical surface are provided on the outer ring and the clutch shaft, respectively, not on the clutch shaft and the outer ring as in the first embodiment.

The outer ring 11B and an input shaft 15B are coupled together by a torque-setting elastic member 29B in the form of a leaf spring.

The input shaft 15B has a pin 31 fixed to its outer periphery. The pin 31 is received in an elongated hole 32 formed in the inner periphery of the outer ring 11B so that a clearance A will be left between the pin 31 and the hole 32 in the direction of rotation.

By the provision of the pin 31 and the hole 32, the combination of the polygonal end portion 26 and the square hole 27 employed in the first embodiment can be omitted. Otherwise, this embodiment is the same in structure as the first embodiment.

When using the clutch of the second embodiment into the power steering assembly shown in FIG. 6, the outer ring 11B is coupled to the pinion shaft 64, thus allowing the driving force of the motor 67 to be transmitted to the clutch shaft 12B.

THIRD EMBODIMENT

Figure 10:
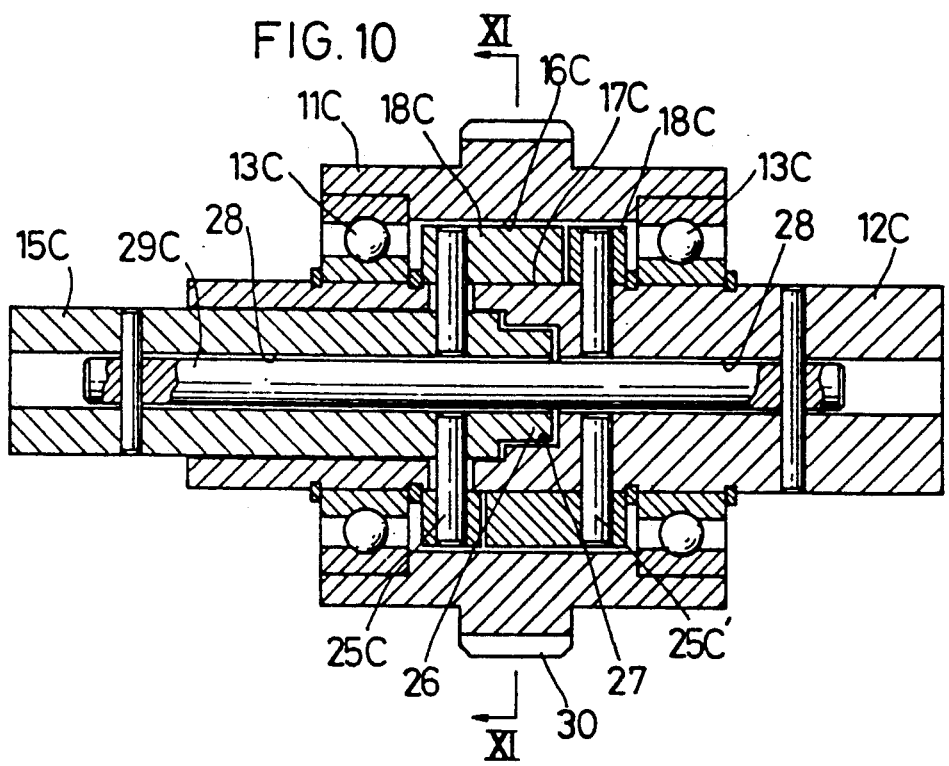
FIG. 10 is a vertical sectional front view of the third embodiment.
Figure 11:
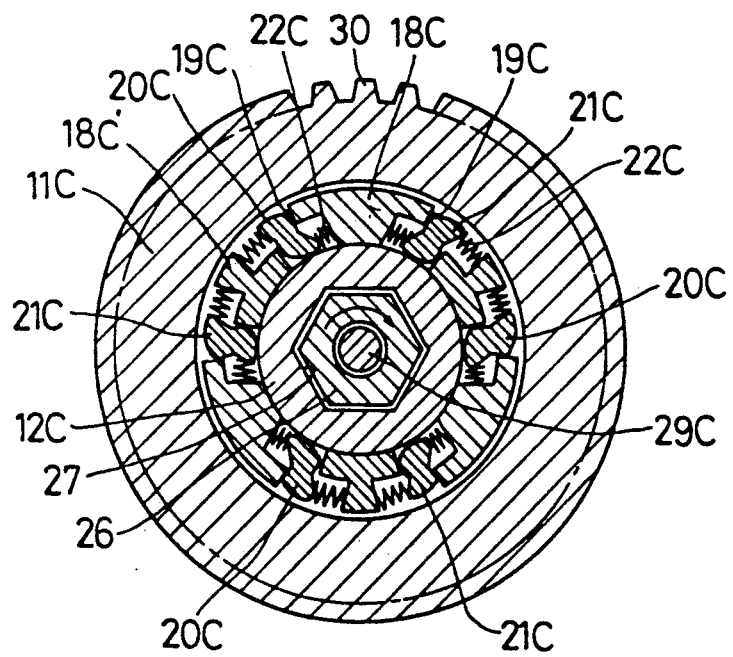
FIG. 11 is a sectional view of the same taken along line 11—11 of FIG. 10.

FIGS. 10 and 11 show the third embodiment in which an outer ring 11C is formed on its inner periphery with a cylindrical cam surface 16C and a clutch shaft 12C, too, is formed on its outer periphery with a cylindrical cam surface 17C.

A pair of tubular cages 18C and 18C' are interposed between the cam surfaces 16C and 17C. The cage 18C is coupled to the input shaft 15C by means of pins 25C and the other 18C' is coupled to the output shaft 12C by means of pins 25C'. A plurality of pockets 19C are defined between the cages 18C and 18C'. Cam members 20C for forward rotation and cam members 21C for reverse rotation are mounted in the respective pockets 19C alternately with each other. The cam members 20C and 21C are in the form of cocoon-shaped sprags and are biased by springs 22C so as to engage the cam surfaces 16C and 17C. This embodiment is the same as the first embodiment in any other points in structure.

Supposing that the input shaft 15C and thus the portion 26 are turned in the direction of arrow of FIG. 11 or in the forward direction, when its turning torque exceeds a preset torque determined by the bias of the torque-setting elastic member 29, the cage 18C adapted to rotate together with the input shaft 15C will rotate relative to the cages 18C' coupled to the clutch shaft 12C. This will increase the circumferential length of the pockets 19C having received therein the cam members 20C for forward rotation and shorten the circumferential length of the pockets 19C having received therein the cam member 21C for reverse rotation. The cam members 20C for forward rotation will rise to assume an upright position into engagement with the cam surfaces 16C and 17C, whereas the cam members 21C for reverse rotation will be inclined and kept out of engagement with the cam surfaces 16C and 17C. When a turning torque is applied to the outer ring 11C in this state, the torque will be conveyed to the clutch shaft 12C through the cam members 20C for forward rotation.

FOURTH EMBODIMENT

FIGS. 12 through 17 show the fourth embodiment in which an outer ring 11D has a cylindrical inner surface 16D. An input shaft 15D rotatably supported by a bearing 40 mounted on an outer ring 11D at one end thereof so as to be coaxial with the outer ring 11D. An output shaft 12D is rotatably supported by a bearing 41 mounted on the outer ring 11D at the other end thereof so as to be coaxial with the input shaft 15D.

The output shaft 12D has a cylindrical outer surface 17D. A plurality of sprags 35 are mounted between the cylindrical surface 17D on the output shaft 12D and the cylindrical surface 16D on the outer ring 11D at angularly equal intervals.

Figure 15:
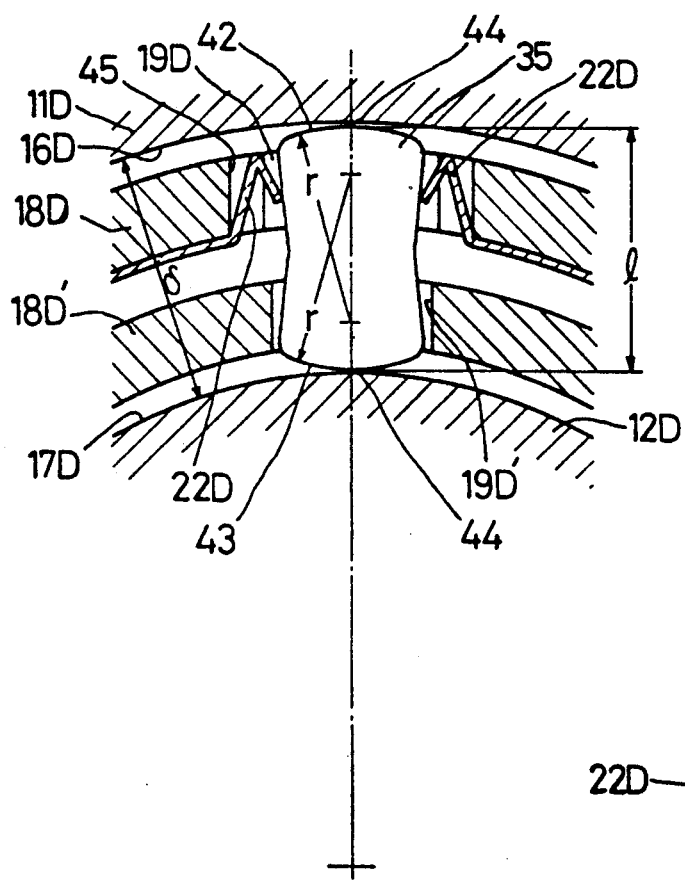
FIG. 15 is an enlarged sectional view of one of the sprags showing how it is mounted in the clutch.
Figure 16:
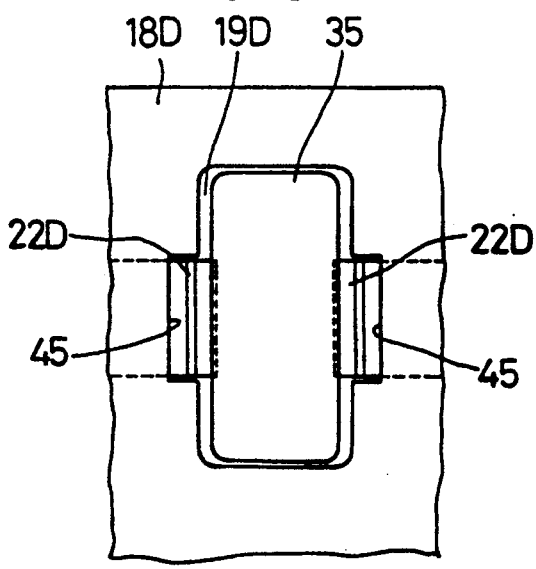
FIG. 16 is a plan view of FIG. 15.

As shown in FIG. 15, the sprags 35 have their inner and outer peripheries 42 and 43 arcuately shaped. The arcuate peripheries 42 and 43 have such a radius of curvature r as to be larger than half the distance $\delta$ between the cylindrical surfaces 16D and 17D. The distance l between the center of the arcuate periphery 42 and that of the arcuate periphery 43 is slightly shorter than the distance. Thus, when the sprags 35 are in an upright position or a neutral position, radial clearances 44 are formed between the arcuate surfaces 42 and 43 on the sprags 35 and the cylindrical surfaces 16D and 17D, respectively. When the sprags 35 incline in a circumferential direction from the neutral position, their outer arcuate surface 42 and inner arcuate surface 43 will be brought into engagement with the cylindrical surfaces 16D and 17D, respectively.

The sprags 35 have their outer end portion set in pockets 19D formed in a cage 18D provided at the end of the input shaft 15D and have their inner end portion received in pockets 19D' formed in a cage 18D' fixedly mounted on the end of the output shaft 12D. The cage 18D is formed in the circumferentially opposed side walls of the pockets 19D at the central portion thereof with recesses 45. Elastic members 22D are fitted in the respective recesses 45 to urge the sprags 35 from both sides into their neutral position.

Figure 12:
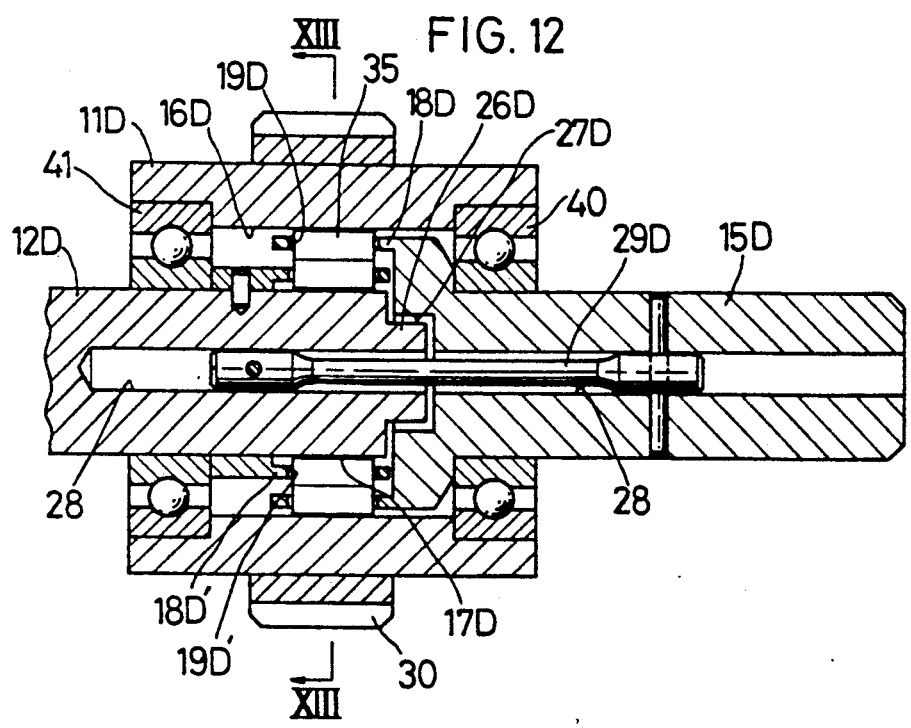
FIG. 12 is a vertical sectional view of the fourth embodiment.
Figure 13:
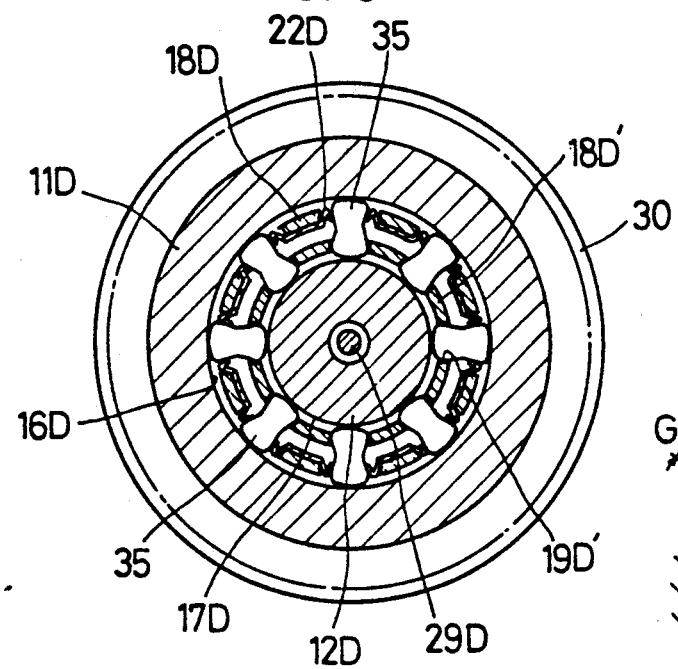
FIG. 13 is a sectional view of the same taken along line 13—13 of FIG. 12.
Figure 14:
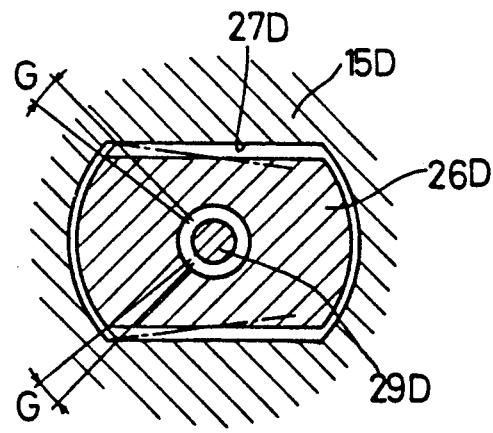
FIG. 14 is a sectional view of the input shaft and output shaft of the fourth embodiment showing how they are in engagement with each other.

As shown in FIGS. 12 and 14, the input shaft 15D is formed in its end face opposed to the output shaft 12D with a square hole 27D, whereas the output shaft 12D is formed at its end with a square portion 26D adapted to be received in the hole 27D.

The square end portion 26D engages in the square hole 27D with a play in the direction of rotation. (FIG. 14) A torque-setting elastic member 29D is mounted between the input shaft 15D and the output shaft 12D to hold the square end portion 26D in such a position that clearances G are formed in the direction of rotation.

The torque-setting elastic member 29D is in the form of a torsion bar. It is received in axial holes 28 formed in the input shaft 15D and the output shaft 12D and has its both ends secured to the respective shafts by means of pins.

The torque-setting elastic member 29D is adapted to be distorted when subjected to a torque larger than a preset value, until the clearances G in the direction of rotation disappear. This will bring the input shaft 15D and the output shaft 12D into engagement with each other through the square end portion 26D.

When applying the clutch of the fourth embodiment to the electric power steering assembly shown in FIG. 6, the input shaft 15D is coupled to the steering shaft 61 provided with the steering wheel 60, and the output shaft 12D is coupled to the shaft 64 of the pinion 63 in meshing engagement with the rack 62.

Suppose that the steering wheel 60 is turned so that the input shaft 15D will be turned clockwise in FIG. 15. If the turning torque applied to the input shaft 15D is smaller than the preset torque of the torque-setting elastic member 29D, the cage 18D at the input shaft side will scarcely turn with respect to the cage 18D' at the output shaft side, because the torque-setting elastic member 29D is hardly distorted. Thus the sprags 35 are held in their neutral position.

This means that no turning torque is transmitted from the outer ring 11D to the output shaft 12D while the manual steering force is small and the vehicle wheels are controlled solely by the manual steering force.

Figure 17:
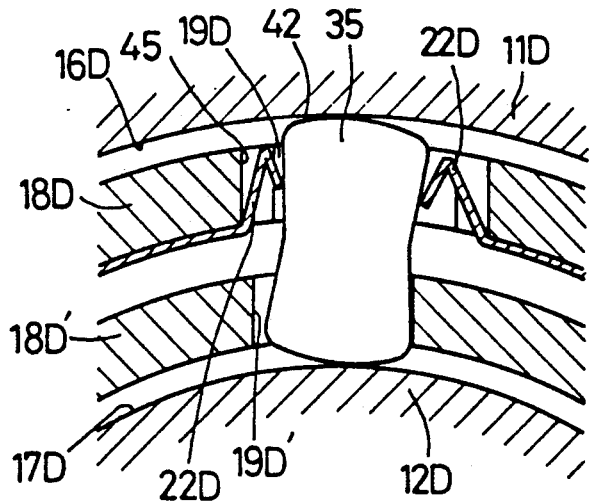
FIG. 17 is a view similar to FIG. 15 and showing a different state therefrom.
Figure 21:
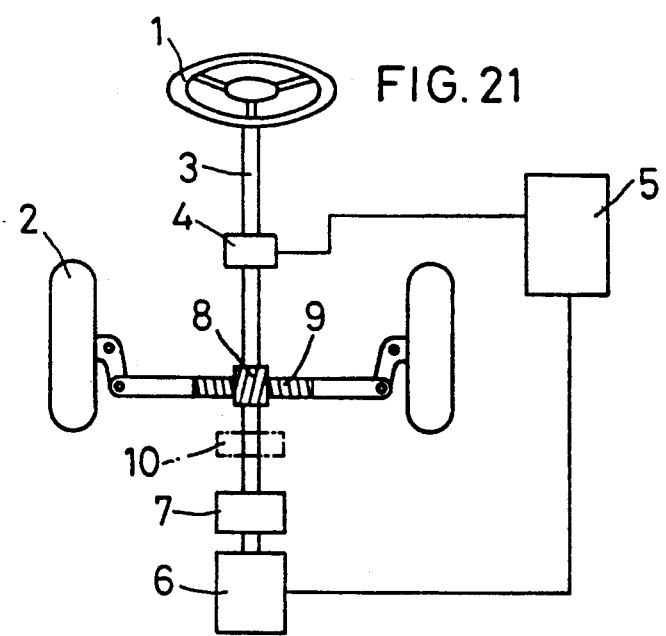
FIG. 21 is a schematic view of a prior art electric power steering assembly.

When the manual steering force exceeds the preset torque determined by the bias of the torque-setting elastic member 29D, the member will be considerably distorted, turning the cage 18D at the input shaft side with respect to the cage 18D $\propto$ at the output shaft side. This will cause the sprags 35 to be tipped to the right-hand side as shown in FIG. 17, thus bringing their outer and inner arcuate surfaces 42 and 43 into engagement with the cylindrical surface 16D on the outer ring 11D and the cylindrical surface 17D on the output shaft 12D, respectively. Now the outer ring 11D and the output shaft 12D are drivingly coupled together.

The vehicle wheels will offer resistance when the steering force is transmitted to the wheels, so that a turning torque produces to the steering shaft 61, thus starting the motor 67 through the control unit 66. The driving power of the motor 67 is transmitted to the outer ring 11, then to the output shaft 12D, which is now in engagement with the outer ring 11D through the sprags 35, and to the vehicle wheels through the pinion shaft 64, pinion 63 and rack 62.

As described above, the power steering mode is put into operation when the manual steering force exceeds the preset torque, making it possible to control the vehicle wheels with a minimum manual steering force.

Next, we shall describe the operation of the clutch if the outer ring 11D should get locked owing to some trouble of the driving system including the control unit 66 and the motor 67 while the sprags 35 have their outer and inner arcuate surfaces 42 and 43 in engagement with the cylindrical surfaces 16D and 17D, respectively. When the input shaft 15D is turned until the clearances G in the direction of rotation disappear, the square hole 27D will get into engagement with the square end portion 26D, thus allowing the torque of the input shaft 15D to be transmitted to the output shaft 12D and to the vehicle wheels through the pinion shaft 64, pinion 63 and rack 62. The cage 18D' at the output shaft side will be simultaneously turned in the same direction as the cage 18D at the input shaft side, thus pushing the sprags 35 with one side surface of its pockets 19D'. Since the sprags 35 are also pushed by the cage 18D through the elastic members 22D at one side in the pockets 19D, they will slide on the cylindrical surface 16D of the outer ring.

The steering force is now transmitted to the vehicle wheels through the output shaft 12D, pinion shaft 64, pinion 63 and rack 62 with the driving system disengaged from the steering system. Thus a manual steering force necessary to control the vehicle wheels is kept low. Otherwise, the operation of the clutch of the fourth embodiment is substantially the same as the other embodiments.

FIFTH EMBODIMENT

FIGS. 18 to 20 show the fifth embodiment in which an output shaft 12E is inserted in an outer ring 11E and rotatably supported by two bearings 13E mounted on the inner periphery of the outer ring 11E at its both ends.

An input shaft 15E is inserted in an axial bore 14E formed in the output shaft 12E and is coupled to a cage 18E mounted around the output shaft 12E at its end by pins 51 received in a pin hole 52 formed diametrically in the output shaft 12E. The input shaft 15E has a polygonal end portion 26E engaged in a polygonal hole 27E formed in the end face of the output shaft 12E with clearances C in the direction of rotation. Otherwise, this embodiment is substantially the same in structure as the fourth embodiment. Like references in the drawings show like parts.

In the fifth embodiment, since the output shaft 12E is supported by the two bearings 13E, it can be held more rigidly in position. This will permit the transmission of a larger torque.

What is claimed is:

1. A clutch comprising:
an outer ring formed on its inner periphery with a first cam surface;
an output shaft rotatably supported in said outer ring and formed on its outer periphery with a second cam surface;
an input shaft rotatably mounted in said outer ring and coupled with said output shaft;
a pair of bearings, one of which supports said output shaft and the other of which supports said input shaft;
a cage interposed between said outer ring and said output shaft and formed with a plurality of pockets, each pocket having a peripheral outer portion and a peripheral inner portion;
a plurality of cam members in the form of sprags disposed between said bearings and mounted in said pockets for engagement with said first and second cam surfaces;
elastic means mounted in said pockets for biasing said sprags into engagement with opposing walls of said pockets;
means for providing a clearance in one direction of rotation between said sprags and one of said first and second cam surfaces; and
a torque setting elastic member mounted between said input shaft and one of said outer ring and said output shaft for holding said sprags in a neutral position with said clearance in said one direction of rotation between said sprags and said one of said first and second cam surfaces deformed until said clearance disappears when said torque setting elastic member is subject to a torque larger than a predetermined torque;
said sprags being out of engagement with one of said first and second cam surfaces in said neutral position.

2. A clutch, as recited in claim 1 wherein said cage comprises a first cage member coupled to said input shaft and formed with a plurality of pockets for receiving an outer periphery of said sprags and a second cage member coupled to said output shaft and formed with a plurality of pockets for receiving an inner periphery of said sprags.

3. A clutch, as recited in claim 1, wherein said sprags have inner and outer arcuately shaped peripheries having a radius of curvature larger than half the distance between said first and second cam surfaces with a distance between the centers of said arcuately shaped surfaces slightly shorter than the distance between said first and second cam surfaces.

* * * * *